No. 608,198. Patented Aug. 2, 1898.
R. T. HEWLETT.
MILK STERILIZER.
(Application filed Sept. 1, 1897.)

(No Model.)

WITNESSES
John Buckler
C. Gerst

INVENTOR
Richard T. Hewlett
BY
Edgar Tate & Co.
ATTORNEYS.

THE NORRIS PETERS CO., PHOTO-LITHO., WASHINGTON, D. C.

UNITED STATES PATENT OFFICE.

RICHARD TANNER HEWLETT, OF LONDON, ENGLAND.

MILK-STERILIZER.

SPECIFICATION forming part of Letters Patent No. 608,198, dated August 2, 1898.

Application filed September 1, 1897. Serial No. 650,267. (No model.)

*To all whom it may concern:*

Be it known that I, RICHARD TANNER HEWLETT, a subject of the Queen of Great Britain, residing at London, in the county of Middlesex, England, have invented certain new and useful Improvements in Milk-Sterilizers, of which the following is a full and complete specification, such as will enable those skilled in the art to which it appertains to make and use the same.

This invention relates to milk-sterilizers; and the object thereof is to provide an improved device of this class which is simple in construction and operation; and with this and other objects in view the invention consists in the construction, combination, and arrangement of parts hereinafter described and claimed.

It is a well-established fact that many of the disorders of infants fed upon artificial foods or milk are due to the presence and action of bacteria, and especially is this the case when milk is used, and it is a further fact that these bacteria, or the most of them, may be destroyed by heating the milk to a temperature of from 65° to 70° or upward. By heating the milk in this manner it is rendered far more wholesome and may be safely given to infants without producing diarrhea and kindred troubles, which are, as a rule, produced by bacteria germs and which, as is well known, are destroyed by a temperature of 65° or upward.

In order to produce a condition of sterility in milk or a destruction of the germs therein, the practice has frequently been to boil the milk; but there are many objections to boiled milk, as this process gives the milk a scalded taste and makes it thin and, as is held by some, destroys to an extent the nutrient qualities thereof. It has been found, however, that heating the milk to a temperature of from 60° to 70° does not produce this effect, while at the same time this temperature will, as hereinbefore stated, be sufficient to destroy the germs referred to.

The chief object of my invention is to provide an effective device by which milk may be heated to a temperature of 60° or upward by boiling water, a further object being to provide a device of this class which is simple in construction and operation and which may be conveniently used by any one; and the invention is fully disclosed in the following specification, of which the accompanying drawings form a part, in which the separate parts of my improvement are designated by the same numerals of reference in each of the views, and in which—

Figure 1:
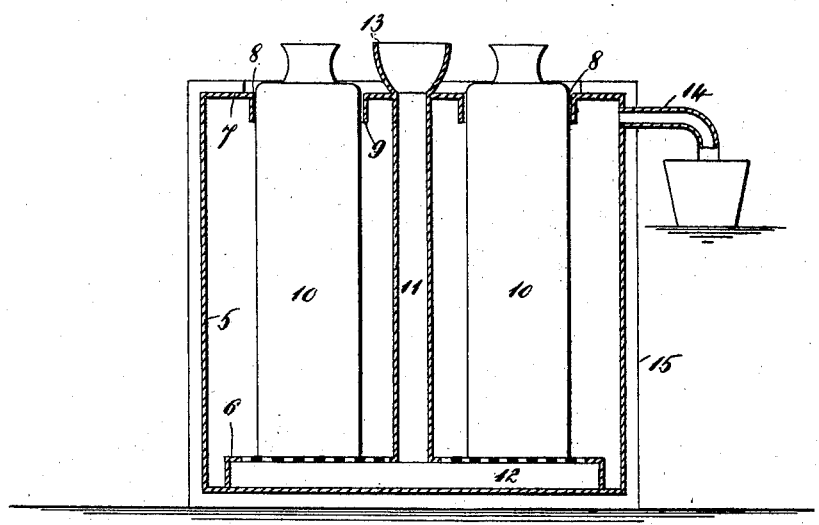
Figure 2:
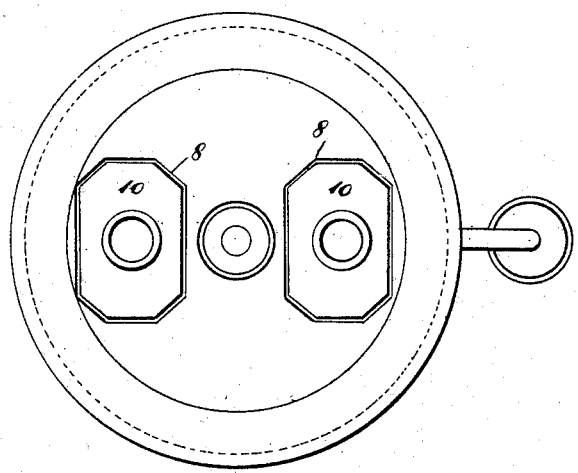

Figure 1 is a central vertical section of my improved milk-sterilizer, and Fig. 2 a plan view thereof.

In the practice of my invention I provide a device of the class herein specified which consists of a casing 5, which is preferably cylindrical in cross-section and which is made of metal and which is also provided near the bottom thereof with a perforated plate 6, which is supported about half an inch above the bottom of the vessel or receptacle 5 in any desired manner. The vessel or receptacle 5 is also provided with a top 7, in the opposite sides of which are formed oblong openings 8, each of which is provided with a depending rim or flange 9, and in these openings I insert or place bottles 10, which are preferably of such size as to hold about half a pint, and these bottles are designed to rest upon the perforated plate 6, and in this position the upper ends thereof project slightly through the top of the vessel or receptacle 5. These bottles are preferably oblong in cross-section and are so made as to exactly fit the openings 8 and to be held in position by the depending flanges 9, and passing centrally through the top 7 is a tube 11, the lower end of which is connected with the perforated plate or support 6 and communicates with the space or chamber 12 below the same, and the upper end of the tube 11 is provided with a funnel-shaped attachment 13. I also secure to the vessel or receptacle 5, at or near the top thereof, a tube 14, and the entire vessel or receptacle is inclosed by a casing 15, of asbestos or any suitable non-conducting material.

In practice the milk to be sterilized is placed in the bottles 10 and said bottles are placed in the vessel or receptacle 5, as shown in Fig. 1, and boiling water is poured into the tube 11, and this boiling water rises around the bottles and flows out through the tube 14 when the vessel or receptacle is filled or partially so. When the water begins to overflow through the tube 14, the proper amount has been poured into the vessel or receptacle, and the apparatus is allowed to stand from twenty to thirty minutes and the milk will be sufficiently heated to accomplish the result hereinbefore set out.

The boiling water poured into the vessel or receptacle of course raises the temperature of the milk and gradually becomes cooler, and by properly adjusting the size of the apparatus and the amount of boiling water any desired temperature can be obtained. In this case the temperature aimed at is 68°; but it will be apparent that this temperature may be varied as desired by continuing to pour in the boiling water or by pouring in a less amount.

It will be apparent that many changes in and modifications of the construction herein described may be made without departing from the spirit of my invention or sacrificing its advantages, and it will thus be seen that I accomplish the object of my invention by means of a device which is simple in construction and operation and which is also well adapted to produce the result for which it is intended.

The top of the apparatus may be provided with a suitable cover, if desired, and any desired or preferred number of the bottles 10 may be employed.

Having fully described my invention, I claim as new and desire to secure by Letters Patent—

An improved device or apparatus for sterilizing milk and for analogous purposes, comprising a closed vessel or receptacle having openings in its top through which corresponding bottles or similar vessels are adapted to be inserted, said vessel or receptacle being interiorly provided with a raised bottom forming a supplementary base-chamber and having a perforated top arranged with relation to the openings in the top of the vessel or receptacle and adapted to form a support for the bottles or similar vessels when the latter are inserted into position within the sterilizing device, a tube being arranged to extend between said supplementary base-chamber and the top of the vessel or receptacle and having an outlet through the closed top of the latter, and an overflow pipe or outlet being arranged to extend from the top portion of the vessel or receptacle, substantially as and for the purpose set forth.

In testimony that I claim the foregoing as my invention I have signed my name, in presence of the subscribing witnesses, this 14th day of July, 1897.

RICHARD TANNER HEWLETT.

Witnesses:
RICHARD HORE ADKINS,
RONALD SYDD HERDMAN.